(12) United States Patent
Riener et al.

(10) Patent No.: US 8,376,753 B2
(45) Date of Patent: Feb. 19, 2013

(54) METHOD AND DEVICE FOR LEARNING AND TRAINING DENTAL TREATMENT TECHNIQUES

(76) Inventors: Robert Riener, Vaterstetten (DE); Rainer Burgkart, München (DE)

(*) Notice: Subject to any disclaimer, the term of this patent is extended or adjusted under 35 U.S.C. 154(b) by 0 days.

(21) Appl. No.: 10/511,936

(22) PCT Filed: Apr. 16, 2003

(86) PCT No.: PCT/DE03/01283
§ 371 (c)(1),
(2), (4) Date: Aug. 3, 2005

(87) PCT Pub. No.: WO03/090179
PCT Pub. Date: Oct. 30, 2003

(65) Prior Publication Data
US 2006/0019228 A1  Jan. 26, 2006

(30) Foreign Application Priority Data

Apr. 19, 2002 (DE) ................ 102 17 630

(51) Int. Cl.
  *G09B 19/00* (2006.01)
(52) U.S. Cl. .......... 434/263; 434/262; 434/264
(58) Field of Classification Search .......... 434/263, 434/264, 266, 236; 700/117
See application file for complete search history.

(56) References Cited

U.S. PATENT DOCUMENTS

| | | | | |
|---|---|---|---|---|
| 4,435,163 A | * | 3/1984 | Schmitt et al. | 434/263 |
| 5,158,488 A | | 10/1992 | Berlinghoff et al. | |
| 5,688,118 A | * | 11/1997 | Hayka et al. | 433/27 |
| 6,428,323 B1 | * | 8/2002 | Pugh | 434/274 |
| 2002/0077542 A1 | * | 6/2002 | Vilsmeier et al. | 600/424 |
| 2002/0082724 A1 | * | 6/2002 | Hennion | 700/45 |
| 2004/0091845 A1 | * | 5/2004 | Azerad et al. | 434/263 |

FOREIGN PATENT DOCUMENTS

| | | |
|---|---|---|
| DE | 10017119 A1 | 10/2001 |
| JP | 05204300 A | 8/1993 |
| JP | 05303327 A | 11/1993 |
| JP | 2001051593 A | 2/2001 |
| WO | WO98/15234 A1 | 4/1998 |
| WO | WO02/37453 A1 | 5/2002 |

* cited by examiner

*Primary Examiner* — Xuan Thai
*Assistant Examiner* — Banafsheh Hadizonooz
(74) *Attorney, Agent, or Firm* — Kriegsman & Kriegsman

(57) ABSTRACT

The invention relates to a method and device for learning and training dental treatment techniques, according to which a force is applied to a tooth (2) preferably by means of tools (4) in order to examine or treat this tooth. A mandible (1) or the tooth (2) is coupled to a force measuring device (3) in a manner that enables the forces applied to the tooth (2) to be represented in the form of electric measurement signals (5) that are fed to a data processing device (6). Said data processing device has a data memory (7) in which a multitude of reference force/time courses of different force/time-determined tooth treatment steps can be stored in a manner that enables them to be retrieved, whereby the forces applied to the tooth (2) and their temporal course are compared with a reference force/time course.

3 Claims, 2 Drawing Sheets

METHOD AND DEVICE FOR LEARNING AND TRAINING DENTAL TREATMENT TECHNIQUES

The invention relates to a method for learning and training dental treatment techniques, according to which preferably by means of varius tools a force is applied to a tooth in order to examine or treat it. The invention further relates to a device for the execution of the method.

Teaching and training devices for the simulation and training of dental clinical operations have been known from the state of the art. As to that, document DE 3941 332 describes such a teaching and training device comprising a cabinet with a hinged phantom head und various drawers for accommodating tools. Japan document JP 05204300A describes a model of a mandible comprising artificial teeth. These teeth consist of materials showing mechanical properties similar to natural teeth. The artificial teeth are exchangably fastend, for example by means of screwed fastening, and after a treatment exercise such as drilling the tooth concerned is replaced by a new artificial tooth.

In principle, the above mentioned teaching and training devices are suitable for learning elementary dental operations. The outcome of the training is ascertained mainly by monitoring the results, showing, for example, whether the drill hole shows the optimum shape. The monitoring of the results, however, is more complicated if operations are to be trained by which the tooth is examined only, for example, if it is examined by means of a mechanical instrument to detect decayed areas. For this purpose it is necessary that the instructing dentist closely watches the student's activity. It is very difficult, however, to check whether an operation at a tooth simulated, such as the removal of tartar, is executed properly. Theoretically it would be possible to provide an artificial tooth with a coat showing a mechanical property which is similar to tartar. The manufacture of artificial teeth of such specific properties, however, takes great efforts and consequently it is very expensive. Furthermore there are supervisory controls exercised by the dentist manually only, for example to find out, how firmly seated a tooth is. It is most difficult to check such a supervisory control, because it is not possible for the supervising dentist to make out the expenditure of force applied by the student to move the tooth.

To sum it up it can be said that it is connected with difficulties to learn and control dental operations in which mainly by means of an instrument or a tool predetermined forces are applied to a tooth, as the movements, shifts and effects caused to the tooth by the forces are relatively small. Furthermore it is not always possible to conclude from the result of a tooth treatment that there has been an optimum execution of the relative operation. If, for example, it is necessary to drill close to the nerve of a tooth, it is not possible to avoid pain for the patient. A good dentist will therefore reduce the period of drilling in the course of which the pain occurs to a minimum. Therefore, if a student on the one hand is able to drill an optimum hole close to the nerve of a tooth for a filling, but on the other hand causes unnecessary pain to the patient by too slow drilling, i.e. by a too long period of drilling, it is necessary that the student is even better trained.

Up to now suitable methods or devices to learn and train such complex operations have not been available.

Therefore it is the object of the invention to provide suitable methods or devices for the training of dentists by means of which force-determined operations at a tooth or at a mandible with and without tool can be learned and trained better.

This object is solved by a method and a device.

The method serves to learn and train dental treatment techniques, according to which by means of a tool or even manually forces are applied to a tooth in order to examine or treat the tooth. This may concern an artificial tooth or even a natural tooth. The tooth or several teeth are arranged in an artificial mandible. A force measuring device, which transmits an electric signal appropriate to the force applied, is fixed to the mandible or even to an individual tooth. The force measuring device is configured by the specialist on the basis of certain design parameters and economic considerations. Force measuring devices come under the state of the art and are offered as modules, such as multiple-component force sensors. If a multiple-component force sensor is used to measure forces or even torques effective in various directions or differing in the orientation, this can be fixed to the mandible. If necessary, a strain gauge arrangement which allows to measure forces taking effect in various directions can be applied even to a single tooth. Such an arrangement, however, is applicable in exceptional cases only, because the treatment of this tooth by means of a tool incurs the danger of damaging the strain gauges.

If the trained experienced dentist examines the tooth by means of a tool or starts the application of forces to the tooth by means of a tool, for example a drill or pliers, the electric measuring device converts these forces into electric measurement signals, which are fed to a data processing device and stored by it. Like this a characteristic reference force/time course is created for a special action, such as the examination of the tooth by means of a needle or the drilling of a hole. The data memory of the data processing device stores a multitude of reference force/time courses representing most different steps of examination and treatment of a tooth treatment. The force/time courses created by a person to be trained, hereinafter called student, in the course of the examination or treatment are compared with the reference force/time courses and evaluated objectively. For the evaluation of the force/time course created by the student's exercise it is together with the reference force/time course displayed on a screen in an optically comparable manner. For this purpose visualization methods known from the state of the art may be used, such as the superimposition of two curves the deviation of which from each other is represented as coloured area. An objective evaluation follows from the determination of a correlation coefficient existing between the curves, in which case the value of the correlation coefficient represents the measure as to what extent the student has reached the skills of a trained dentist. It is further possible to display the force/time courses as computer animations. As a result, drilling a tooth, for example, can be displayed on the screen as a computer animation which is very near to the reality, in order to allow the student to compare the drill hole effected by himself with the drill hole effected by a specialist. Here correlation methods are used as well to find out the degree of conformity between the stored and the actual force/time course or the values derivable from it, such as movements or points of force application.

Additionally it should be noted that by methods of visual computer animation known from the state of the art a multitude of didactically valuable effects can be created. Thus, for example, blood and spittle as are connected with a bleeding tooth treatment can be simulated and integrated in the computer simulation in order to display a most realistic simulation of the tooth treatment.

In detail the method is carried out in the following steps:
Selection of a reference/time course which corresponds to the tooth treatment to be learned or trained, such as the preparation of a molar for filling. For this purpose the student is instructed to drill a hole of a predetermined shape and size at a predetermined place of the tooth. The reference force/time course or the computer animation matched to this purpose is displayed on the screen.

Start of the simulated tooth treatment, i.e. the tool is positioned on the tooth like a customary drill and conducted, measuring of the forces applied to the tooth and detection of the magnitude and direction thereof in the course of time. By means of correlation methods known from the measured-value analysis the stored measured values are compared with the actual measured values, thereby showing whether a predetermined correlation has been achieved.

According to one feature, the space coordinates of the force application points of the tool are calculated from the force components of the measured forces and from the measured torques belonging to them so that a movement/time course of the tool application point is derivable and representable. This actual time course of the movement is compared with the stored reference movement/time course by means of correlation methods, thereby showing whether a predetermined movement/time correlation has been achieved.

According to another feature, during the simulated tooth treatment depending on a predetermined force/time course audible signal patterns are retrieved and displayed audibly by means of an acoustic display unit, such as loudspeakers or head phones, which means that screams of pain are played if the calculation shows that the tip of the drill invades the area of the nerve of the root. These sound-samples are stored in an appropriate data base. To create a working situation which is as realistic as possible also typical sounds of tools, such as force dependent drilling sounds or the rubbing sound which develops when tartar is removed, can be played.

According to another feature, the position of the force application point of the tool is localized by means of a navigation system. According to the state of the art optical systems have been known which follow and record the movements of a tool or marks arranged on it by means of one or several cameras. Furthermore displacement and angle measuring systems have been known from robotics which detect and record displacements and rotations of tools. For the detection and recording of space coordinates and space orientations also acoustic and magnetic methods and devices have been known.

According to another feature, the tool itself is also provided with a force measuring device by which forces can be measured the measured values of which are used for the comparison and the correction of the forces and torques detected at the tooth.

The device serves as implementation of the method, i.e. for learning and training dental treatment techniques by which by means of a tool or by hand forces are applied to a tooth held by an artificial mandible in order to examine or treat the tooth. The tooth or the mandible is coupled with a force measuring device which converts the forces applied to the tooth into appropriate electric measurement signals. These measurement signals are fed to a data processing device which includes a data memory in which a multitude of reference force/time courses are stored. These diverse reference force/time courses correspond to the signal pattern of tooth treatment steps executed at the device by a specialist. This method called teaching has been known sufficiently and does not require a further explanation. The measured values are stored in the form of tables of values. Furthermore a control program is provided which controls the data processing device in a manner that a selected reference force/time course and the actual force/time course of the simulated tooth treatment are displayed by an optical display. The forces applied to the tooth and the time courses belonging to them are compared with the stored measured values by means of a correlation method, thereby showing whether the predetermined correlation has been reached.

According to one feature, the device comprises an acoustic display unit and a data memory in which a multitude of sound-samples are stored in a manner that enables them to be retrieved. When, for example, on the occasion of the simulation of the tooth treatment a certain treatment step, as experience shows, causes pains, screams of pains are added to the playback. This further development of the device improves the learning effect.

According to another feature, at least one force measuring device is fastened to the tool for the tooth treatment and designed to measure the forces applied to the tooth by the tool. These measured values are fed to a control and correction program which calculates a measured-value correction of the forces measured at the tooth or at the mandible.

According to another feature a navigation system for the position determination of the tool application point is provided. Such navigation systems for the contacting and non-contacting scanning of bodies have been known especially from robotics. These systems provide a high resolution and thereby improve the accuracy of a measured-value correction.

To sum it up it should be emphasized that by the present invention the learning and training effect for dental treatment techniques is essentially improved compared with all methods, techniques, and devices hitherto known. By the visual and acoustic interaction hand-motory and tactile skills are imparted by specialists to the learner or trainee, who is enabled to perfect treatment and movement steps by repeated executions and reviewing the results simultaneously as well as thereafter.

By the invention it is further possible to impart a course of an action which has not yet been known, that means, which has only theoretically been regarded as optimal or which has been obtained from an optimization calculation, to a trainee or even to a specialist.

Now the description of the invention is made in more detail by means of examples of embodiments and schematic drawings.

Figure 1:
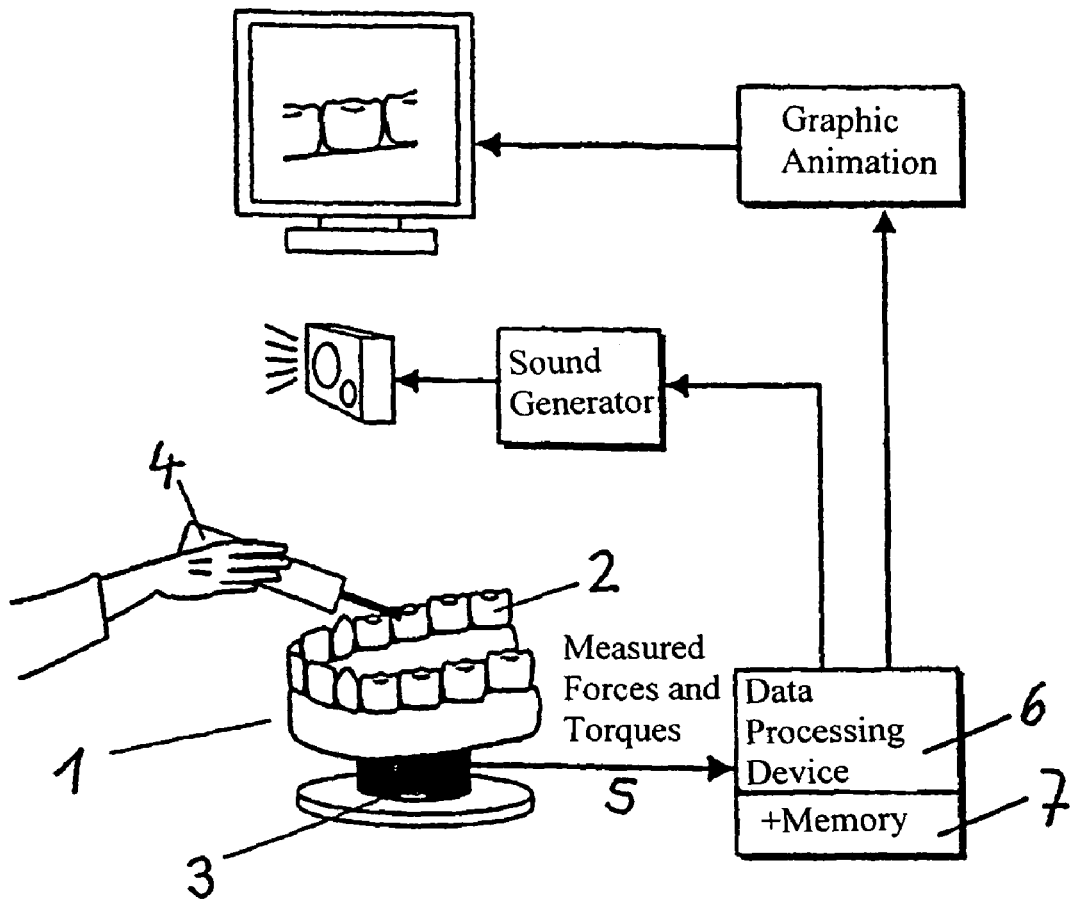
FIG. 1 shows a schematic block diagram of a first embodiment of the invention.

FIG. 1 shows a schematic block diagram of a first embodiment of the invention. A model of a mandible 1 with artificial teeth 2 is fixed to a 6-component force/torque sensor 3. If a tool 4 touches a tooth 2 to examine or treat it force/torque measurement signals 5 are generated by the 6-component force/torque sensor 3 and fed to a data processing device 6. The temporal course of the force/torque measurement signals 5, hereinafter referred to as signal pattern 5, is characteristic for a certain treatment step, such as the examination of a tooth 2 for decayed areas or the drilling of a hole. In a memory 7 of the data processing device a multitude of such signal patterns 5, hereinafter referred to as reference signal patterns, is stored. A reference signal pattern 5 is created by a specialist executing a certain treatment step, that means a teaching is executed as it has been known, for example, from paint-spraying robots which are manually teached the optimum guidance of the paint pistol. It should be noted that in the same treatment step different teeth 2 show different signal patterns 5, i.e. the signal patterns 5 differ according to the special tooth 2 and the kind of treatment.

Moreover the memory of the data processing device stores sound-samples. These are characteristic sounds arising due to a certain treatment step. Regarding the present example knocking and scratching sounds are played. Accordingly, if a hole is to be drilled a typical drilling sound is played which can change depending on the force applied to the tooth.

If a student begins to treat the selected tooth 2 according to a selected treatment step, that means when the tooth 2 concerned is contacted by the tool 4, the procedure starts, and the actual signal pattern is visualized on a screen or also on semiopaque data spectacles. Simultaneously the student sees the optimum reference signal pattern created by the specialist. He will try to change his technique in a way that the signal pattern created by him will look alike the signal pattern by the specialist. When the treatment step is completed the degree of conformity is objectively determined by a correlation calculation. On the basis of the comparison of the signal patterns the following statements rating the student's work are possible:

coincidence of the final results:

A quantitative rating in the form of a percentage may be displayed which states, for example, that the student has achieved 70% of the total performance of the specialist. This statement only refers to the result of the operation and does not consider the period of time in which the result has been reached.

coincidence of the sequence of the individual portions:

The display may show whether the student has executed the individual portions in the correct order.

evaluation of the quality of the portions:

The display may show the quality of the student's action with regard to the individual portions.

coincidence in the time taken up to the attainment of the final result:

The display may show whether the student has executed the individual portions in an adequate total period of time—as compared with the specialist.

chronological coincidence of the individual portions:

The display may show whether the student has executed the individual portions in a mutually adequate relation of time.

Figure 2:
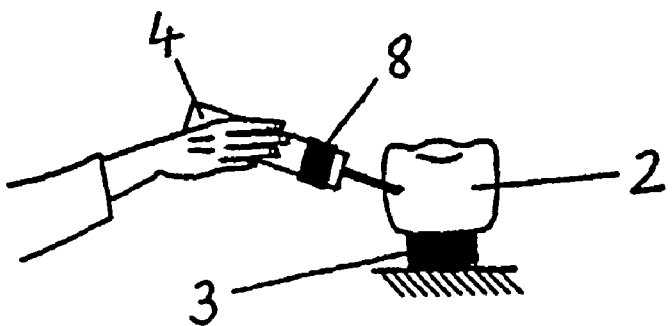
FIG. 2 shows a single tooth and a tool with a force sensor.

FIG. 2 shows a single tooth 2 and a tool 4 comprising a force sensor 8. When the student examines the tooth 2 the forces arising at the tool 4 by the manual force applied are continuously measured and utilized for the measured-value correction of the forces detected by the 6-component force/torque sensor 3.

Figure 3:
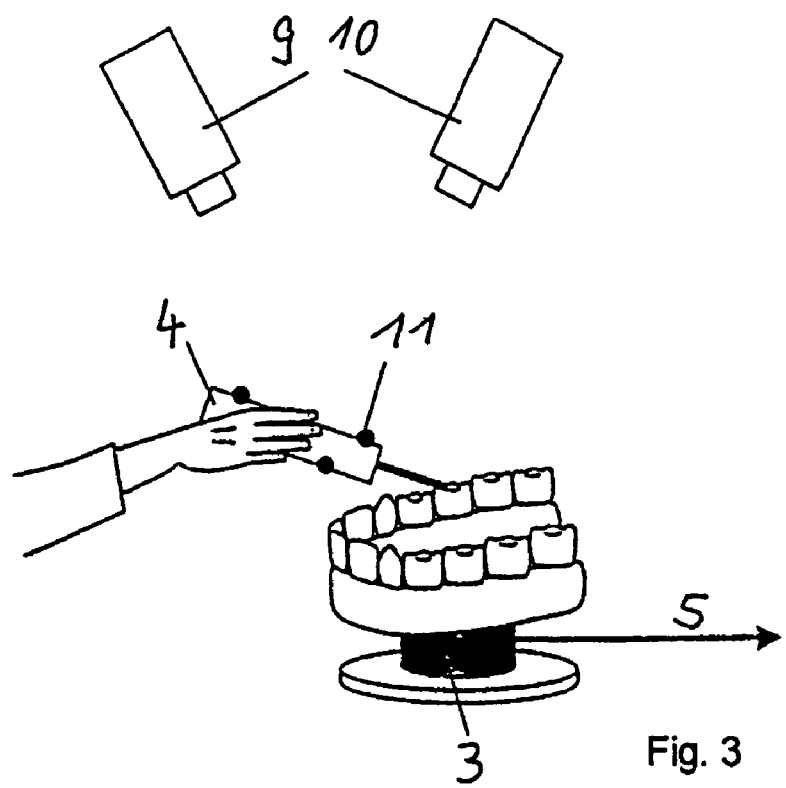
FIG. 3 shows the invention comprising an optic navigation system.

FIG. 3 shows the invention comprising an optical navigation system with two cameras 9, 10. The tool 4 shows marks 11 the movements of which are followed up and recorded by the cameras 9, 10. From the space coordinates of the tool 4 data are obtained which serve the preparation of graphic animations. The space coordinates may also be used for the correction of the points of force application of the tool 4 detected by the 6-component force/torque sensor 3.

Figure 4:
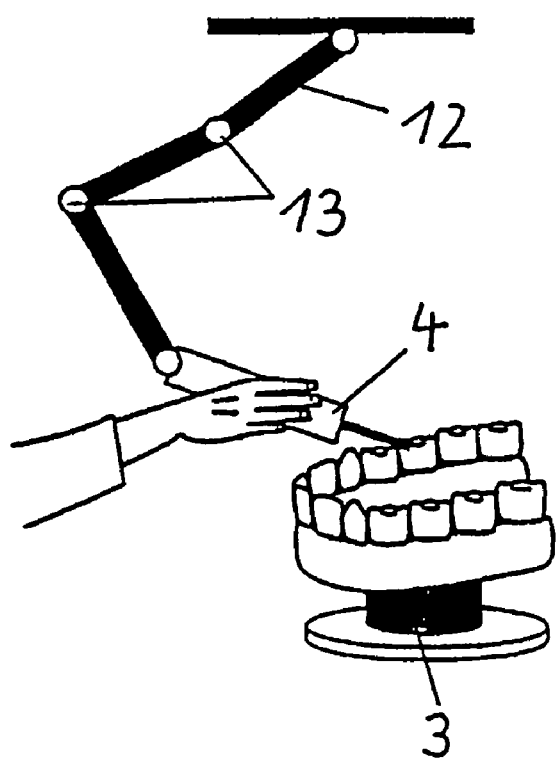
FIG. 4 shows the invention comprising a mechanical navigation system.

FIG. 4 shows the invention comprising a mechanical navigation system according to which the tool 4 is provided with a movable bar construction 12 with angular position measuring systems being arranged in the fulcrum points 13 thereof. This arrangement also allows the detection of the actual space coordinates of the tool 4 and the recording thereof.

It should be noted that the applications of the invention described in the example of embodiment may be modified or enlarged by a specialist without departing from the basic idea of the invention as per the claims.

Legend

A=graphic animation
B=sound generator
5 measured forces and torques
6 data processing device
7 +memory

The invention claimed is:

1. A device for learning and training in dental treatment techniques, wherein forces can be exerted on a tooth secured in a model of a jaw in order to examine or to work on the tooth, the device comprising:

a tool for a user to perform a dental treatment technique on the tooth, the tool exerting forces on the tooth in response to how the user uses the tool to perform the dental treatment technique;

means for converting exerted forces into electrical measuring signals, said converting means comprising a measuring device, the measuring device consisting of a single sensor fixed underneath the model of the jaw, constructed as a six-component force-moment sensor;

a data processor coupled to said sensor so that the measuring signals are fed to the data processor, the data processor including means for imaging the measuring signals as forces according to their magnitude and direction, the data processor further comprising a data memory, in which a plurality of reference-force-time curves of different dental treatment steps can be stored as a table of values that can be called up, means for controlling the data processor such that a selected reference-force-time curve and the actual force-time curve of the simulated dental treatment can be represented on an optical display; and an optical navigation system for the determination of the position of the tool, said navigation system comprising at least one camera.

2. The device as claimed in claim 1 further comprising an acoustic display unit, wherein a multitude of sound-samples are stored in the data memory, in which case by means of a program subject to the actual force-time curve of the simulated tooth treatment a sound-sample belonging to it can be played.

3. The device as claimed in claim 1, wherein the optical navigation system comprises two cameras.

* * * * *